United States Patent
Hester et al.

(10) Patent No.: US 6,755,607 B1
(45) Date of Patent: Jun. 29, 2004

(54) HYDRO-ENERGY CONVERTER

(76) Inventors: Robert George Hester, 28 Herbert Avenue, Wellington, Shropshire TF1 2BP (GB); Ronald William James Hester, The Malt House, 14 High Street, Clun, Shropshire SY7 8JB (GB)

( * ) Notice: Subject to any disclaimer, the term of this patent is extended or adjusted under 35 U.S.C. 154(b) by 0 days.

(21) Appl. No.: 10/031,032

(22) PCT Filed: Jul. 14, 2000

(86) PCT No.: PCT/GB00/02721
§ 371 (c)(1),
(2), (4) Date: Apr. 24, 2002

(87) PCT Pub. No.: WO01/06120
PCT Pub. Date: Jan. 25, 2001

(30) Foreign Application Priority Data

Jul. 16, 1999 (GB) .............................. 9916617

(51) Int. Cl.[7] .............................................. F03B 17/06
(52) U.S. Cl. ............................................ 415/3.1; 415/7
(58) Field of Search ...................... 415/2.1, 3.1, 7, 415/8, 66, 144, 905, 906; 60/495, 497; 417/331, 334, 337; 290/53, 54

(56) References Cited

U.S. PATENT DOCUMENTS

| | | | | |
|---|---|---|---|---|
| 109,335 A | * | 11/1870 | Morgan .................... 415/3.1 X |
| 1,008,396 A | * | 11/1911 | Scoter .......................... 415/7 |
| 1,105,846 A | * | 8/1914 | Schneider ...................... 415/7 |
| 1,350,265 A | * | 8/1920 | Recuero ...................... 415/66 |
| 1,460,495 A | * | 7/1923 | Molander ...................... 415/7 |
| 1,476,229 A | * | 12/1923 | Suess ........................ 415/7 X |
| 1,529,824 A | * | 3/1925 | Adelmann .................. 415/906 |
| 2,310,816 A | * | 2/1943 | Taylor ..................... 415/3.1 X |
| 4,383,797 A | * | 5/1983 | Lee ................................ 415/7 |
| 4,843,249 A | * | 6/1989 | Bussiere ...................... 290/53 |
| 5,430,332 A | * | 7/1995 | Dunn, Jr. ..................... 415/3.1 |

FOREIGN PATENT DOCUMENTS

| DE | 19537597 | 10/1997 |
|---|---|---|
| DE | 19608987 | 12/1997 |

OTHER PUBLICATIONS

International Search Report Sep. 25, 2000.

* cited by examiner

Primary Examiner—Edward K. Look
Assistant Examiner—Richard A. Edger
(74) Attorney, Agent, or Firm—Ira S. Dorman

(57) ABSTRACT

A hydro-energy converter comprises a rotary member (9, 57) for converting energy of running water into rotary motion, means (3, 65, 67) for securing the rotary member in a position such that water can run past the rotary member, and baffle means (21, 63) for creating a head of water upstream of the rotary member.

25 Claims, 3 Drawing Sheets

HYDRO-ENERGY CONVERTER

The present invention relates to a hydro-energy converter and, more particularly but not exclusively, relates to a hydro-energy converter which is portable, able to float and capable of operating with a relatively low head which may be created by the converter itself.

The energy of running water has been exploited for very many years. However, traditional approaches have suffered disadvantages due to environmental factors, for example:

(a) damming a river floods land that would otherwise be available for use, alters the landscape, creates risk (such as of the dam failing), affects the local community that would have lived and worked on the flooded land, alters the character of the river, and prevents the free movement of fish;

(b) diverting a river affects the nature of the countryside and does not lend itself to use on a large scale; and (c) permanent complete or partial blockage of a river for energy conversion is adversely affected by variations in flow.

It is therefore an object of the present invention to provide a hydro-energy converter which uses the potential energy of flowing water and which is environmentally acceptable.

According to the present invention there is provided a hydro-energy converter comprising a rotary member for converting energy of running water into rotary motion, means for securing the rotary member in a position such that water can run past the rotary member, and baffle means for creating a head of water upstream of the rotary member. The securing means may be configured for releasably securing the converter to a bed over which water is running.

A further rotary member may be provided with the further rotary member being located downstream of the first-mentioned rotary member.

A flow deflector may be provided at least in the region around the lower upstream quadrant of the rotary member. The flow deflector may be generally arcuate.

A plurality of cover plates may be provided over at least part of, and downstream of, the rotary member for deflecting water over the cover plates for concealing at least a part of the converter. At least the downstream cover plates may be pivotably mounted for minimising resistance to flow under flood conditions.

The baffle means may be provided immediately upstream of the rotary member. The baffle means may be pivotably mounted for minimising resistance to flow under flood conditions.

The rotary member may be connected to a buoyant member, for example by way of an arm which is pivotably connected to both the rotary member and the buoyant member. The buoyant member may be tethered to a base on which the rotary member is mounted. The tether length may be adjustable. Power generating means may be provided on the buoyant member and operatively connected to the rotary member.

The rotary member may be rotatable about an upright axis or an axis extending in the direction of the flow of water, such as a turbine. Alternatively, the rotatable member may be rotatable about an axis extending transverse to the direction of flow of water, such as a paddle wheel or the like.

The paddles of the wheel may be constructed to minimise resistance to the flow of oncoming water above the transverse axis of the wheel. For example, the paddles may be pivotably mounted in the region of the periphery of the wheel and rotatable at the free end thereof between a position bearing against a centre portion of the wheel in which the paddle presents maximal resistance to the oncoming flow of water and a trailing position in which the paddle presents minimal resistance to the oncoming flow of water.

The converter may include a passage permitting fish to swim past the rotary member.

Because the converter is anchored or tethered and not positioned in a permanent manner, it is a relatively straightforward matter to remove the converter from one location and to replace it at another location. That is, the converter is portable.

Thus the converter can rest, for example, on the bed of a river and at least a part of the converter can float as the level of the river rises. One or more converters can be tethered or anchored at various locations in a river for the purpose of generating electricity, pumping water or operating mechanisms or the like. To this end, the rotary member may be connected to an electrical generator, pump or the like and which may form part of the converter tethered or anchored relative to the running water or may be located remotely and connected to the rotary member by a suitable linkage, for example hydraulic or mechanical.

The nature of the converter is such that it need never totally block the natural flow of the river. There is no need for the converter to dominate the landscape, endanger fish or interfere adversely with recreational pursuits such as fishing or boating. The converter does not change the character of the river or create any harmful by-products.

Thus the converter of the present invention provides a means of generating clean power in an environmentally friendly manner.

For a better understanding of the present invention and to show more clearly how it may be carried into effect reference will now be made, by way of example, to the accompanying drawings in which.

Figure 1:
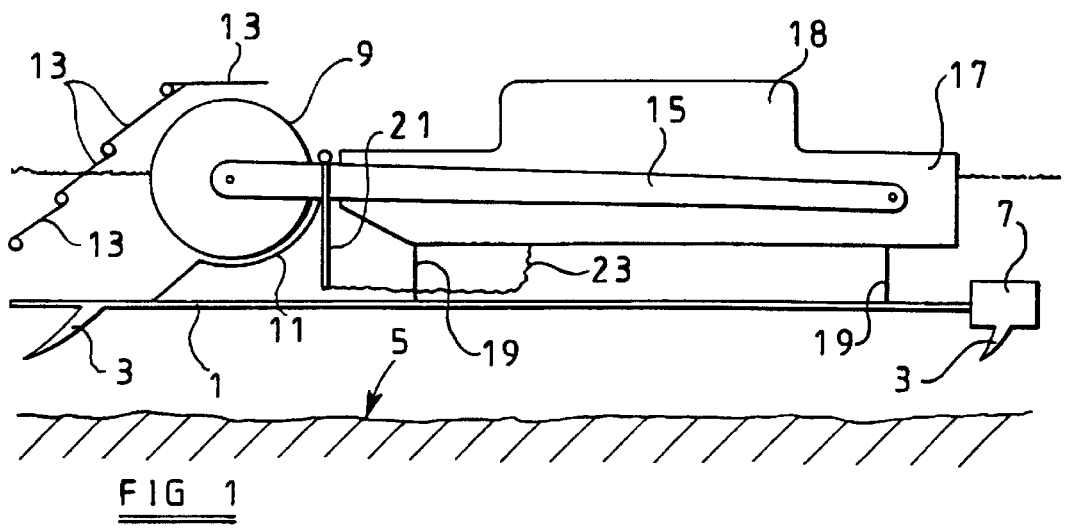
FIG. 1 is a diagrammatic side view of one embodiment of a hydro-energy converter according to the present invention ready for installation in a river bed.

The hydro-energy converter shown in FIG. 1 comprises a base 1 having anchoring means 3, for example at the upstream and downstream ends of the base, f or anchoring the base securely to a river bed 5 or the like. The upstream end of the base is provided with a ballasting member 7 for ensuring the upstream end of the base bears firmly against the river bed or the like.

A rotary member 9, for example in the form of a paddle wheel, is mounted in the region of the downstream end of the base 1 and is provided for extracting energy from the water flow. Extending primarily around the lower upstream quadrant of the paddle wheel 9 is an arcuate flow guide member 11 for improving the efficiency of the paddle wheel 9. Although not shown in FIG. 1, side walls are provided to guide water past the paddle wheel 9. Extending above and downstream of the paddle wheel 9 is a number of cover plates 13 of which at least the downstream cover plates are pivotably mounted, the purpose of which cover plates will be explained in more detail hereinafter.

Pivotably mounted relative to the base 1 and extending in an upstream direction from the axis of rotation of the paddle wheel 9 is an arm 15 which is rotatably connected at its upstream end to a buoyant member 17 which houses a power generator 18, pump or the like. Mechanical power may be transmitted from the paddle wheel 9 to the generator for example by power transfer means provided in or adjacent to one or both arms. The buoyant member 17 is tethered at the bottom thereof to the base 1 in a manner which permits the length of the tether 19 to be increased and decreased. Pivotably mounted on the arm 15 a short distance upstream of the paddle wheel 9 is a baffle member 21 for generating a head of water to flow over the top of the baffle member and onto the blades of the paddle wheel, following the arcuate profile of the flow guide member 11. The baffle member 21 may be pivotable, for example, by way of a tie member 23, the purpose of which will be explained in more detail hereinafter.

The baffle member 21 creates in conjunction with the cover plates 13 and the flow guide member 11 a form of chamber having a restricted inlet between the top of the baffle member 21 and the most upstream of the cover plates 13, the inlet being at a level at least as high as the axis of rotation of the paddle wheel 9. The chamber also has an outlet between the most downstream of the cover plates 13 and the flow guide member 11 (or the base 1 with which the flow guide member may merge at its downstream end), the outlet having a greater area than that of the inlet to prevent water building up within the chamber. The height difference between the top of the baffle member 21 and the flow guide member 11 (or the base 1) creates a head for driving the paddle wheel 9.

The buoyancy of the buoyant member 17 may be variable in order that the level at which the buoyant member floats can be adjusted or for effecting installation or maintenance of the hydro-energy converter. The level at which the buoyant member 17 floats can be used for regulating the flow of water to the paddle wheel 9.

The hydro-energy converter is installed as illustrated in FIG. 1. The tether 19 is reduced in length to draw the buoyant member 17 and the base 1 together, and the buoyancy of the buoyant member 17 is raised (for example by pumping water out of a chamber) to a level at which the buoyant member and the base member can float as a single unit as shown in FIG. 1. In this configuration the hydro-energy converter can be floated into its desired operating position thereby minimising installation costs. With the hydro-energy converter in position, the length of the tether 19 can be increased to allow the base 1 to sink to the river bed or the like where the anchor members (which are preferably angled to extend in a downstream direction) of the anchoring means 3 become embedded in the river bed to maintain the hydro-energy converter in position. The buoyancy of the buoyant member 17 can then be adjusted for operational use.

Figure 2:
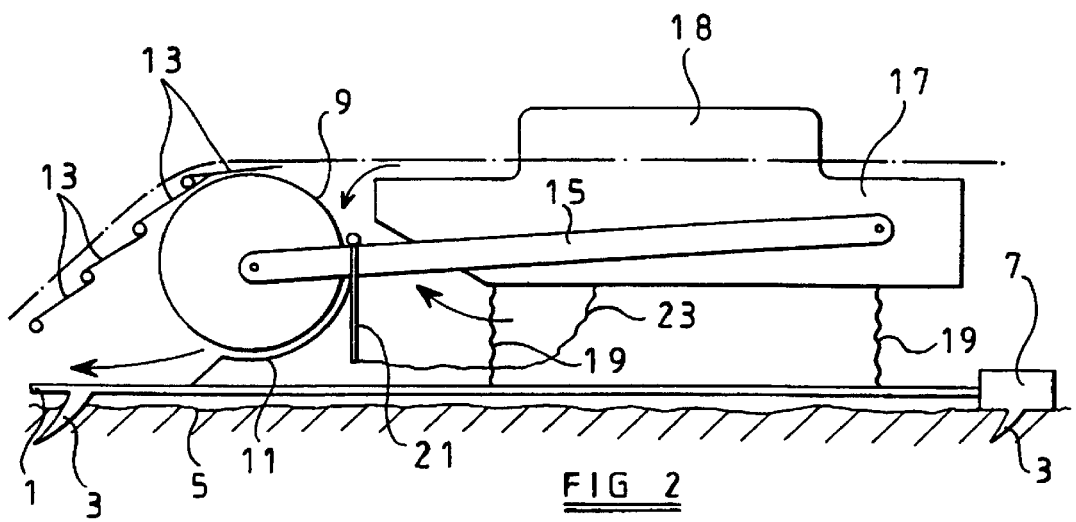
FIG. 2 is a diagrammatic side view of the hydro-energy converter of FIG. 1 installed in a river bed and operating under low river conditions.

FIG. 2 shows the hydro-energy converter in use in low river conditions. Under such conditions the buoyant member 17 floats only a short distance above the base 1. For aesthetic and environmental reasons the buoyancy of the buoyant member is adjusted so that at least the majority of the buoyant member 17 is a little below the surface of the flowing water. In this way, water flows over and below the buoyant member.

The lower downstream surface of the buoyant member 17 is preferably configured to allow water flowing over and under the buoyant member to merge before flowing over the baffle member 21 and past the paddle wheel 9, bearing against the blades thereof-to cause the wheel to turn. Rotary motion of the paddle wheel 9 is transmitted to the buoyant member 19 by any convenient means (not shown) where it is employed for example to generate electricity in generator 18.

A proportion of the water passing over the buoyant member 17 is channelled by the most upstream of the cover plates 13 which acts as an inlet flow restrictor to the paddle wheel 9 and diverts a proportion of the water flow over the tops of the cover plates 13 so as to conceal the cover plates and the paddle wheel 9 beneath the water. The pivotable cover plates 13 all bear on the pivot axis of the next downstream cover plate (apart from the most downstream cover plate which bears on a fixed member) so as to form a substantially continuous surface for the water to flow over. Thus, the space beneath the cover plates 13 is generally only partially filled with the water that has served to rotate the paddle wheel 9.

Figure 3:
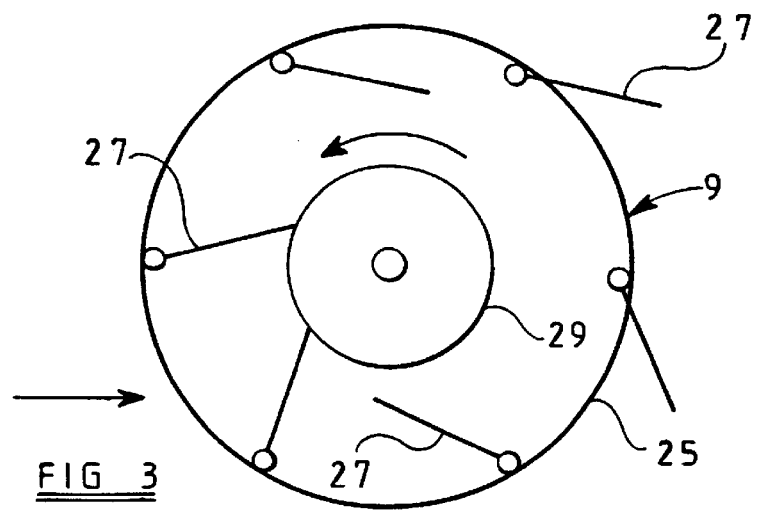
FIG. 3 is a side elevational view of a form of rotary member for use in the converter of FIGS. 1 and 2.

If desired, the paddle wheel 9 forming the rotary member may have a configuration designed to minimise resistance to the flow of oncoming water, such as that illustrated in FIG. 3. This is particularly useful when the river is in flood. Alternatively or additionally the power take-off system for the paddle wheel 9 can incorporate a clutch mechanism to allow free wheeling of the paddle wheel if necessary or desirable. The paddle wheel shown in FIG. 3 comprises a wheel 25 with a plurality of paddle blades 27 secured around the periphery of the wheel in a pivotable manner. The free end of each paddle blade is able to bear against a central core 29 of the paddle wheel. The arrangement is such that the paddle blades are urged against the central core when generating power to cause the paddle wheel to rotate, but when not generating power are free to rotate and present minimal resistance to the flowing water. As the paddle blades descend ready to generate power, the free end of the blade falls under gravity against the central core 29.

Figure 4:
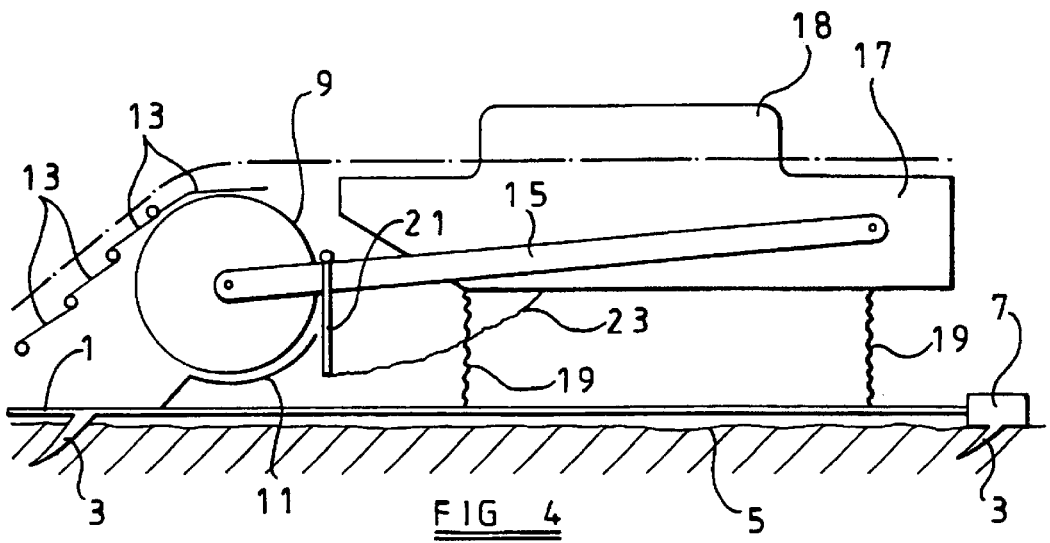
FIG. 4 is a diagrammatic side view of the hydro-energy converter of FIG. 1 installed in a river bed and operating under high river conditions.

FIG. 4 shows the hydro-energy converter in use in high river conditions. Under such conditions the buoyant member 17 floats further above the base 1 than under low river conditions to allow a greater flow of water between the bottom of the buoyant member 17 and the baffle 21.

The lower downstream surface of the buoyant member 17 continues to allow water flowing over and under the buoyant member to merge before flowing over the baffle member 21 and past the paddle wheel 9, but with a greater flow of water bearing against the blades of the paddle wheel to cause the wheel to turn.

Again a proportion of the water passing over the buoyant member 17 is channelled by the most upstream of the cover plates 13 which acts as an inlet flow restrictor to the paddle wheel 9 and diverts a proportion of the water flow over the tops of the cover plates 13 so as to conceal the cover plates and the paddle wheel 9 beneath the water.

Figure 5:
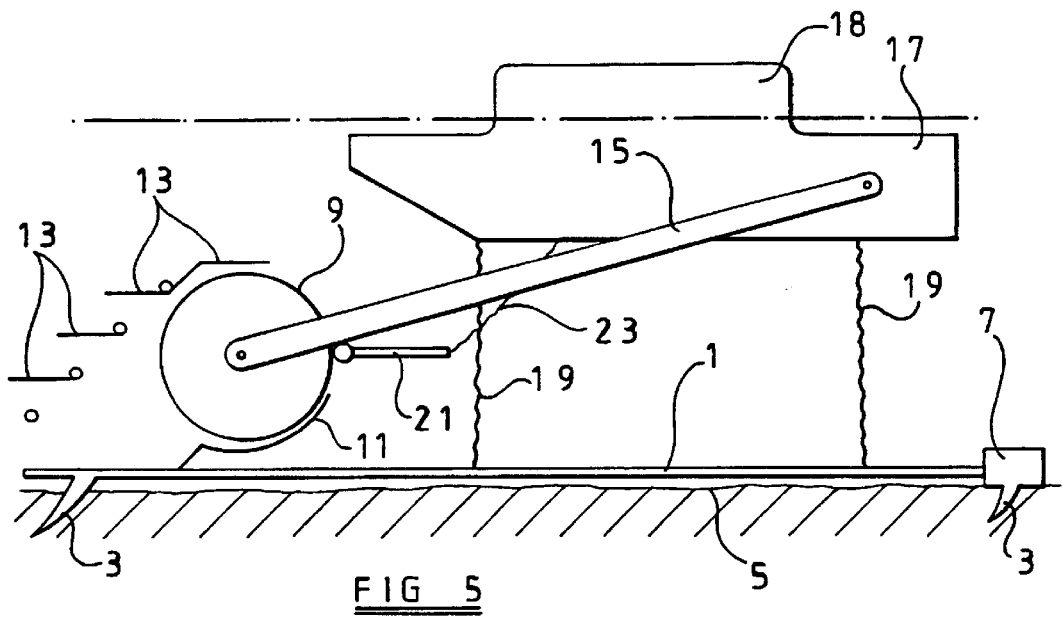
FIG. 5 is a diagrammatic view of the hydro-energy converter of FIG. 1 installed in a river bed and operating under flood conditions.

FIG. 5 shows the hydro-energy converter in use in flood conditions. Under flood conditions the buoyant member 17 floats further above the base 1 than under high river conditions to allow a greater flow of water between the bottom of the buoyant member 17 and the baffle 21. Additionally, the tie member 23 is operated as a result of the higher level of the buoyant member 17 so as to raise the baffle member 21 to present minimal resistance to water flow. Further, the downstream ends of the pivotable cover plates 13 are caused to raise by the water flow, again to present minimal resistance to water flow.

Clearly, raising of the baffle member 21 and pivoting of the cover plates 13 can be effected in a different manner should this be desirable.

The hydro-energy converter may include a channel (not shown), for example along one side thereof, to permit fish, boats or the like to pass the paddle wheel and thus to use the river.

Figure 6:
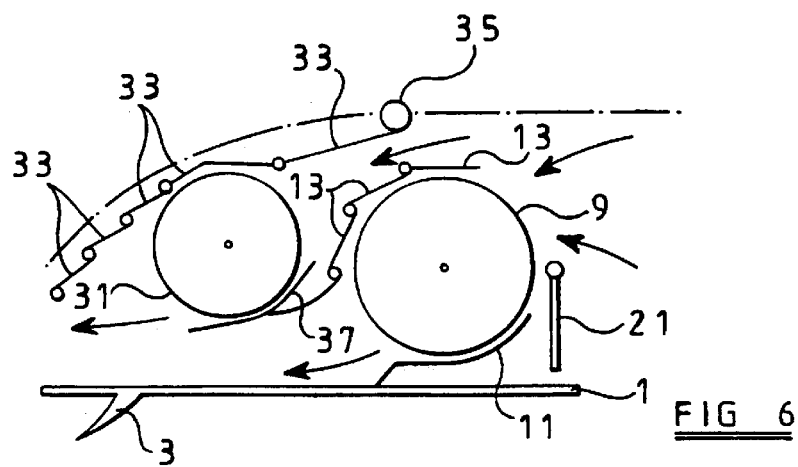
FIG. 6 is a diagrammatic side view of another embodiment of a hydro-energy converter according to the present invention.

The hydro-energy converter shown in FIG. 6 is similar to that shown in FIG. 1 except that an additional paddle wheel 31 is provided. An additional set of cover plates 33 is provided over the additional paddle wheel with the most upstream cover plate 33 being provided with a buoyant element 35 for raising the upstream end of the cover plate when the depth of water flowing over the cover plates 33 is sufficient to turn the additional paddle wheel 31. Even with the buoyant element 35 raised a certain amount of water passes over the cover plates 33 to conceal the same beneath a f film of water. A further flow guide member 37 extends around the lower upstream quadrant of the paddle wheel 31 for directing the flow of water and for improving the efficiency of the paddle wheel.

Figure 7:
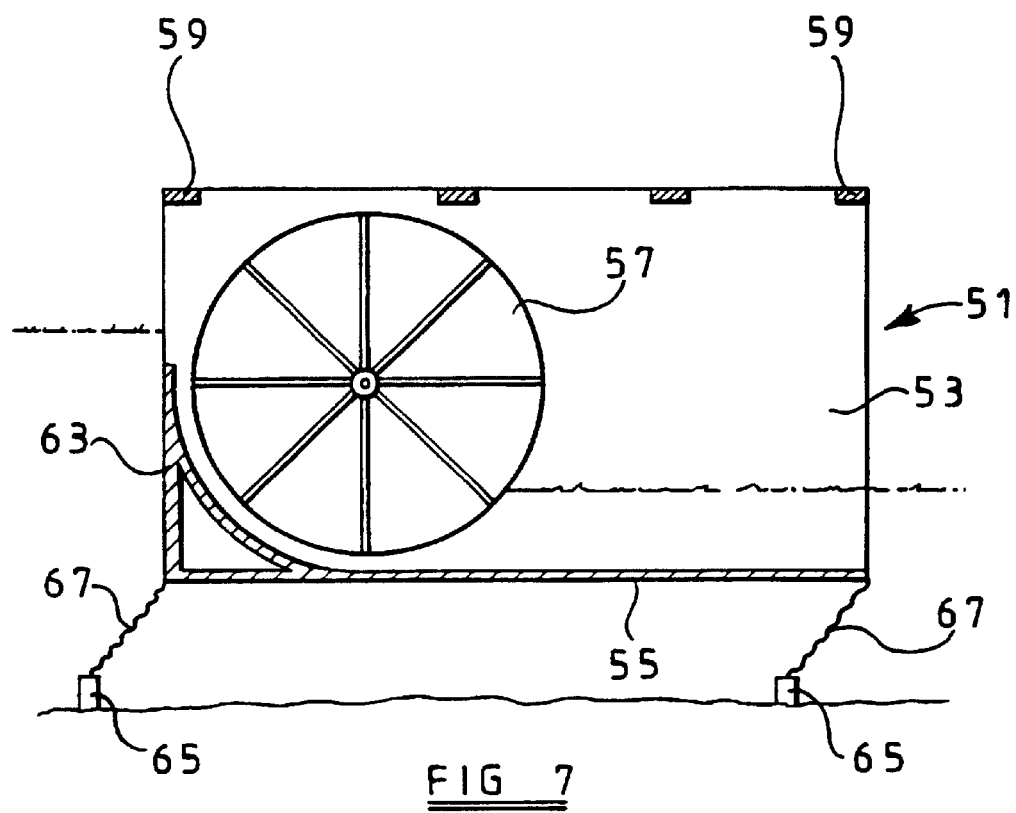
FIG. 7 is a diagrammatic side view, in cross-section, of a further embodiment of a hydro-energy converter according to the present invention.
Figure 8:
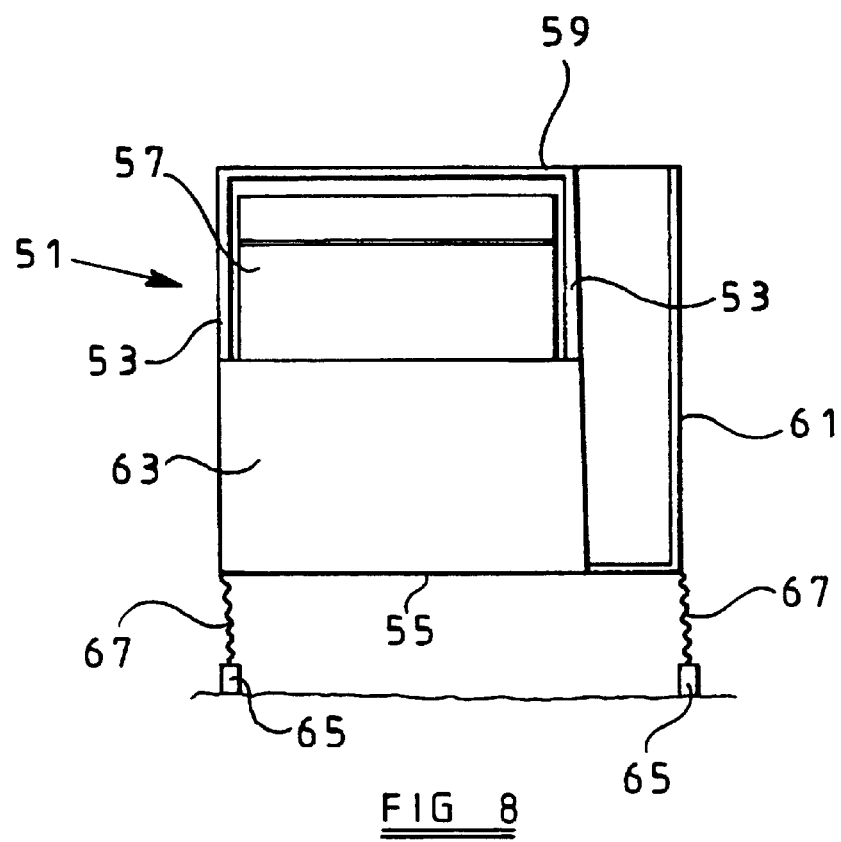
FIG. 8 is a front view of the hydro-energy converter of FIG. 7.

The hydro-converter shown in FIGS. 7 and 8 comprises a housing 51 including side members 53 and a base 55 for channelling water flow past a rotary member in the form of a paddle wheel 57. The housing is open at the top, but is provided with tie members 59 or the like. Positioned externally of one of the side members 53 is a further side member 61 and an extension to the base 55 so as to provide a passage permitting fish to swim past the paddle wheel 57. Upstream of the paddle wheel 57, at the f front of the housing 51, a baffle 63 extends between opposing side members 53 in the region of the lower part only of the side members. The baffle serves to create a relatively low head of water upstream of the converter, the water flowing over the top of the baffle 63 and onto the paddles of the paddle wheel 57 causing the wheel to rotate. Although not shown, a bucket wheel would be an alternative to the paddle wheel illustrated in this embodiment.

The converter is secured to the river bed by tethering means 65 and cables 67 or the like provided in the region of the upstream and downstream ends of the converter and in the region of each side thereof.

Although not shown in the drawings, the converter may include control means for varying the buoyancy thereof in order that the draught of the converter can be maintained at or adjusted to a desired value.

What is claimed is:

1. A hydro-energy converter comprising a rotary member (9, 57) rotatable about an axis extending transverse to a direction of flow of water for converting energy of running water into rotary motion, means (3, 65, 67) for securing the rotary member in a position such that water can run past the rotary member, and baffle means (21, 63) for creating a head of water upstream of the rotary member, wherein the axis of rotation of the rotary member is at a height relative to the baffle means such that a top of the baffle means is at a level at least as high as the axis of rotation of the rotary member, whereby water flows over the top of the baffle means and onto the rotary member between the baffle means and the axis of rotation of the rotary member so as to cause the rotary member to rotate about the axis, and wherein the rotary member is connected to a buoyant member.

2. A hydro-energy converter as claimed in claim 1, wherein the securing means (3, 65, 67) is configured for releasably securing the converter to a bed over which water is running.

3. A hydro-energy converter as claimed in claim 1, wherein the baffle means (21, 63) is provided immediately upstream of the rotary member (9, 57).

4. A hydro-energy converter as claimed in claim 1, wherein the rotary member (9) is connected to the buoyant member (17) by way of an arm (15) which is pivotably connected to both the rotary member and the buoyant member.

5. A hydro-energy converter as claimed in claim 1, wherein power generating means (18) is provided on the buoyant member (17) and operatively connected to the rotary member (9).

6. A hydro-energy converter as claimed in claim 1 and including a passage permitting fish to swim past the rotary member.

7. A hydro-energy converter as claimed in claim 1, wherein the baffle means is pivotably mounted and is connected to the buoyant member by a tie member, whereby under flood conditions the baffle means is raised to present minimal resistance to water flow.

8. A hydro-energy converter as claimed in claim 1, wherein a flow deflector (11) is provided at least in the region around a lower upstream quadrant of the rotary member (9, 57).

9. A hydro-energy converter as claimed in claim 8, wherein the flow deflector (11) is generally arcuate.

10. A hydro-energy converter as claimed in claim 1, wherein the buoyant member (17) is tethered to a base (1) on which the rotary member (9) is mounted.

11. A hydro-energy converter as claimed in claim 10, wherein the length of the tether (19) is adjustable.

12. A hydro-energy converter comprising a first rotary member (9, 57) rotatable about an axis extending transverse to a direction of flow of water for converting energy of running water into rotary motion, means (3, 65, 67) for securing the first rotary member in a position such that water can run past the rotary member, and baffle means (21, 63) for creating a head of water upstream of the first rotary member, wherein the axis of rotation of the first rotary member is at a height relative to the baffle means such that a top of the baffle means is at a level at least as high as the axis of rotation of the first rotary member, whereby water flows over the top of the baffle means and onto the rotary member between the baffle means and the axis of rotation of the rotary member so as to cause the rotary member to rotate about the axis, and wherein a second rotary member is provided, the second rotary member being located downstream of the first rotary member.

13. A hydro-energy converter comprising a rotary member (9, 57) for converting energy of running water into rotary motion, means (3, 65, 67) for securing the rotary member in a position such that water can run past the rotary member, baffle means (21, 63) for creating a head of water upstream of the rotary member, and a plurality of cover plates (13, 33) provided over at least part of, and downstream of, the rotary member (9, 31) for deflecting water over the cover plates for concealing at least a part of the converter.

14. A hydro-energy converter as claimed in claim 13, wherein the rotary member (9, 57) is rotatable about an axis extending transverse to the direction of flow of water.

15. A hydro-energy converter as claimed in claim 13, wherein the rotary member (9, 57) comprises a paddle wheel.

16. A hydro-energy converter comprising a rotary member (9, 57) rotatable about an axis extending transverse to a direction of flow of water for converting energy of running water into rotary motion, means (3, 65, 67) for securing the rotary member in a position such that water can run past the rotary member, and baffle means (21, 63) for creating a head of water upstream of the rotary member, wherein the axis of rotation of the rotary member is at a height relative to the baffle means such that a top of the baffle means is at a level at least as high as the axis of rotation of the rotary member, whereby water flows over the top of the baffle means and onto the rotary member between the baffle means and the axis of rotation of the rotary member so as to cause the rotary member to rotate about the axis, and wherein a plurality of cover plates are provided over at least part of, and downstream of, the rotary member for deflecting water over the cover plates for concealing at least a part of the converter.

17. A hydro-energy converter as claimed in claim 16, wherein at least the downstream cover plates (13, 33) are pivotably mounted for minimising resistance to flow under flood conditions.

18. A hydro-energy converter as claimed in claim 16, wherein the baffle means (21) is pivotably mounted for minimising resistance to flow under flood conditions.

19. A hydro-energy converter comprising a rotary member (9, 57) rotatable about an axis extending transverse to a direction of flow of water for converting energy of running water into rotary motion, means (3, 65, 67) for securing the rotary member in a position such that water can run past the rotary member, and baffle means (21, 63) for creating a head of water upstream of the rotary member, wherein the axis of rotation of the rotary member is at a height relative to the baffle means such that a top of the baffle means is at-a level at least as high as the axis of rotation of the rotary member, whereby water flows over the top of the baffle means and onto the rotary member, between the baffle means and the axis of rotation of the rotary member, so as to cause the rotary member to rotate about the axis, and wherein the rotary member comprises a paddle wheel in which the paddles of the wheel are constructed to minimise resistance to the flow of oncoming water above the transverse axis of the wheel.

20. A hydro-energy converter as claimed in claim 19, wherein the paddles (27) are pivotably mounted in the region of the periphery of the wheel and rotatable at the free end thereof between a position bearing against a center portion (29) of the wheel in which the paddle presents maximal resistance to the oncoming flow of water and a trailing position in which the paddle presents minimal resistance to the oncoming flow of water.

21. A hydro-energy converter as claimed in claim 19, wherein the baffle means is provided immediately upstream of the rotary member.

22. A hydro-energy converter as claimed in claim 19, wherein the baffle means is pivotably mounted for minimising resistance to flow under flood conditions.

23. A hydro-energy converter as claimed in claim 19 and including a passage permitting fish to swim past the rotary member.

24. A hydro-energy converter as claimed in claim 19, wherein a flow deflector is provided at least in the region around a lower upstream quadrant of the rotary member.

25. A hydro-energy converter as claimed in claim 24, wherein the flow deflector is generally arcuate.

* * * * *